April 5, 1938.  F. A. NELSON  2,113,408
WHEEL TOOL
Filed July 30, 1936  2 Sheets-Sheet 1
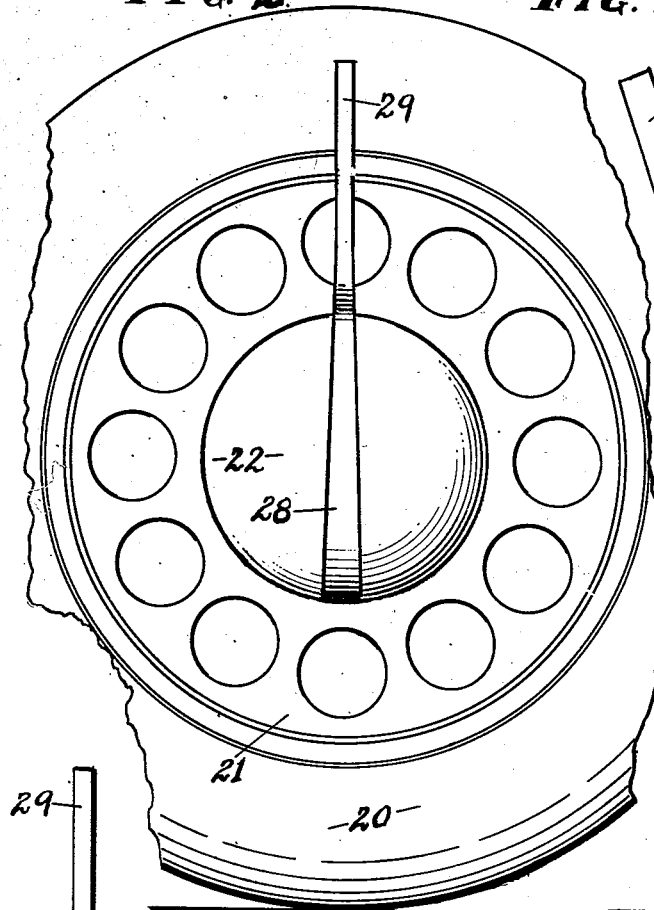
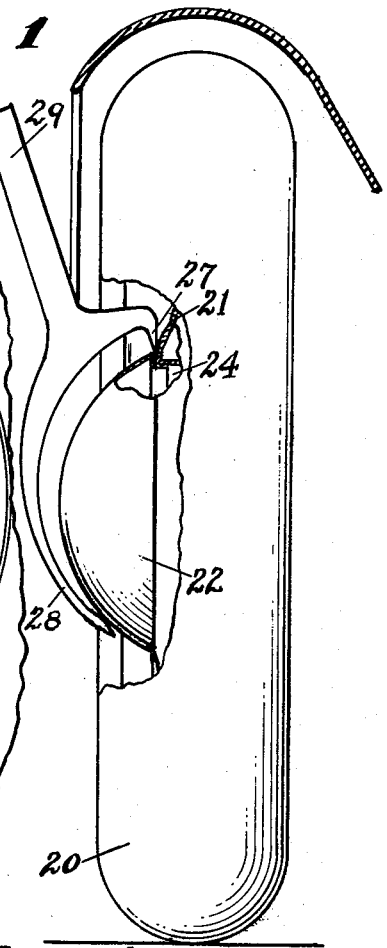
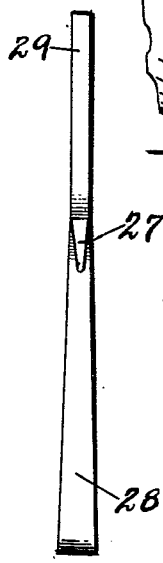
INVENTOR.
Frank A. Nelson
BY
M. Y. Charles
ATTORNEY.

April 5, 1938.  F. A. NELSON  2,113,408
WHEEL TOOL
Filed July 30, 1936  2 Sheets—Sheet 2
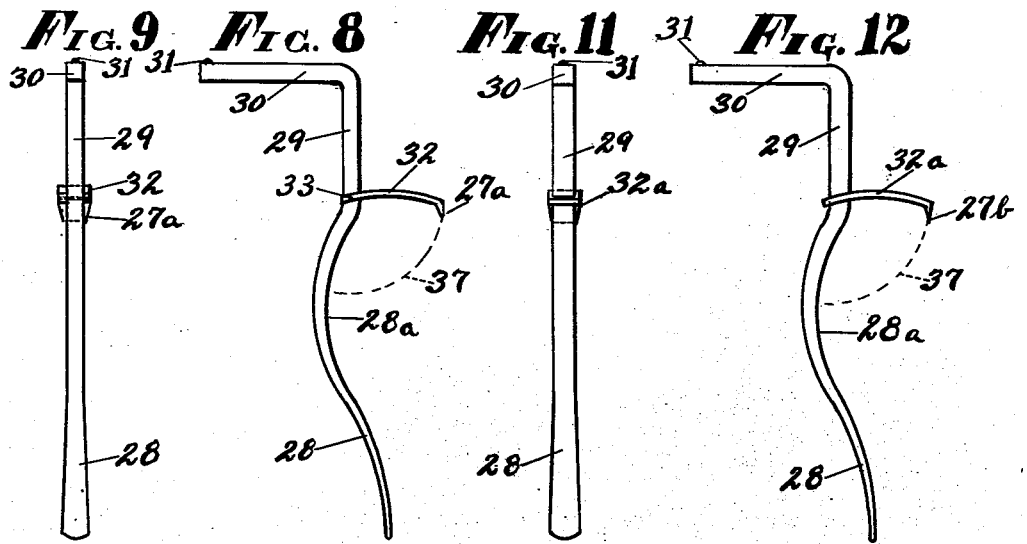
INVENTOR.
Frank A. Nelson
BY
M. Y. Charles
ATTORNEY.

Patented Apr. 5, 1938

2,113,408

UNITED STATES PATENT OFFICE 2,113,408

WHEEL TOOL

Frank A. Nelson, Wichita, Kans., assignor to Earl Martin Fisher, Wichita, Kans.

Application July 30, 1936, Serial No. 93,459

1 Claim. (Cl. 29—85)

My invention relates to an improvement in wheel tools. The object of my invention is to provide a tool for removing large hub caps from automobile wheels. Another object is to provide a tool of the kind mentioned which may also be used to tighten or loosen the nuts that hold the wheel on the hub or mounting therefor. A still further object is to provide a tool of the kind mentioned which may be used as a tire tool for mounting or removing tires from rims or wheels. A still further object is to provide a tool of the kind mentioned, parts of which may be folded so that the tool may be easily packed in a tool kit or the like. These and other objects will be more fully described as this description progresses.

Now referring to the accompanying drawings, Fig. 1 is a side view of a wheel having a hub cap thereon and showing the wheel tool in position for removing the hub cap. Fig. 2 is an edge view of that shown in Fig. 1, parts of which are broken away for convenience of illustration. Fig. 3 is a front detail view of the combination tire tool. Fig. 4 is a top plan view of Fig. 3. Fig. 5 is a bottom plan view of Fig. 3. Fig. 6 is a side view of a modified form of the tool. Fig. 7 is an edge view of the device as seen in Fig. 6. Fig. 8 is a side view of another modified form of the tool. Fig. 9 is an edge view of the tool as seen in Fig. 8. Fig. 10 is a bottom view of the tool as seen in Fig. 8. Fig. 11 is an edge view of still another modified form of the tool. Fig. 12 is a side view of the tool shown in Fig. 11. Fig. 13 is a bottom view of the tool shown in Fig. 12. Fig. 14 is an enlarged detail side view of joinder of the wrench handle and the hub cap hook as seen in Fig. 8, parts being broken away for the convenience of illustration. Fig 15 is a detail sectional view taken along the line XV—XV in Fig. 14. Fig. 16 is an enlarged detail side view of the joinder of the wrench handle and the hub cap hook as seen in Fig. 12, parts being broken away for convenience of illustration. Fig. 17 is a detail sectional view taken along the line XVII—XVII in Fig. 16. Fig. 18 is an edge view of an automobile tire and wheel, parts of which are broken away for convenience of illustrating how the wrench is used in loosening or tightening the hub nuts of the wheel. Similar numerals of reference designate the same part throughout the several figures of the drawings.

In the drawings is shown a tire 20 mounted on a demountable wheel 21 having a friction or spring retained hub cap 22 retained therein to cover the opening or recess 24 in which are positioned the nuts 25 that are threaded on bolts on the hub proper 26 to hold the wheel 21 on the hub 26.

Frequently the hub cap 22 will stick, in the wheel and become hard to remove. I have, therefore, provided my combination tire tool which comprises a sharp pointed hook element 27, which is integrally formed on a presser foot element 28, which is provided with an upwardly extending handle element 29.

As shown in Fig. 1, the hub cap 22 is removed by pressing the sharp point of the hook 27 in the crack between the hub cap 22 and the wheel 21, and allowing the presser foot 28 to rest against the opposite side of the hub cap 22, so that by an outward pull on the handle 29, the hub cap 22 will be removed or pulled from the wheel 21. The lower end of the presser foot 28 is flattened and broadened and the curve thereof is such that the tool becomes useful as a tire tool in mounting or demounting tires on rims or wheels.

In Figures 6 and 7 is shown a modified form of the tool in which the upper end of the handle 29 is provided with an L shape turn element 30. In the outer end of the portion 30 is a spring actuated ball functioning as a retaining element for a socket wrench 32x that may be slipped on the element 30, the object of which will be later explained.

In Figs. 8, 9, 10, 14, and 15 is shown another modified form of the tool in which the presser foot 28 is a continuation of the handle 29, the upper end of which is provided with an L shaped portion 30, in which is a spring actuated ball 31, to retain a socket wrench the same as just described. At 27a is the sharp pointed hook element corresponding to element 27 in Fig. 1, and the element 27a is integrally formed on the curved arm element 32, the end of which is bifurcated and is pivotally mounted at the point 33 on the handle element 29. The base of the cut forming the bifurcation just mentioned is bevelled as shown at 34 so that the arm 32 may be folded downwardly or into the curve 28a of the element 28. The object of this folding feature is that the arm 32 may be folded, as shown in Fig. 18, so as to not interfere with the operation of loosening or tightening wheel bolts or nuts or interfere with the use of the tool as a tire iron in mounting or demounting tires on rims or wheels.

In Figs. 11, 12, 13, 16, and 17 is shown the same tool except that the arm 32a carries the sharp hook 27b and the opposite end of the arm 32a is provided with a hole 35 through which passes the handle element 29 to form a hinge like connection of the element 32a to the elements 28 and 29. The base of the hole 35 is cut with a bevel 36 so that the element 32 may be rocked downwardly, as indicated by the dotted line 37, for folding purposes as previously described.

In Fig. 18 is shown the tool being used as a wrench for the purpose of loosening or tightening nuts in the hub cavity 24 which bind the wheel hub rigidly to the hub proper 26. The element 30 serves to reach into the cavity 24 so that the wrench 26 on the end thereof may engage the nuts 25 for the purposes mentioned. It will be understood that the wrench 26 may be a socket wrench that will slip on and off of the element 30 or it may be a wrench that is integrally formed on or permanently attached to the outer end of the element 30.

Such modifications of my invention may be employed as lie within the scope of the appended claim without departing from the spirit and intention of my invention. Now having fully described my invention, what I claim is new and desire to secure by Letters Patent is:—

In a combination wheel tool; said tool having a shank element, one end of said shank element being flattened and curved to serve the dual purpose of a tire iron and a presser foot as a part of a hub cap tool, a hook element, said hook element being pivotally attached to said shank element above the curved portion thereof, the other end of said shank being bent outwardly to serve as a turning shaft for a wrench that may be placed thereon and as a handle for the tool, said curved portion of said shank functioning as a handle by which said turning shaft may be turned.

FRANK A. NELSON.